US008269747B2

(12) United States Patent
Uei et al.

(10) Patent No.: US 8,269,747 B2

(45) Date of Patent: Sep. 18, 2012

(54) FIELD-SEQUENTIAL DISPLAY APPARATUS AND DISPLAY SYSTEM CAPABLE OF SENSING PIXEL ADDRESS

(75) Inventors: Guo-Feng Uei, Hsinchu (TW); Chih-Cheng Chan, Hsinchu (TW); Min-Feng Chiang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 1205 days.

(21) Appl. No.: 12/015,065

(22) Filed: Jan. 16, 2008

(65) Prior Publication Data

US 2009/0085893 A1 Apr. 2, 2009

(30) Foreign Application Priority Data

Sep. 28, 2007 (TW) ................................ 96136241 A

(51) Int. Cl.
*G06F 3/042* (2006.01)

(52) U.S. Cl. ........................................ 345/175; 345/173

(58) Field of Classification Search .................. 345/173, 345/175
See application file for complete search history.

(56) References Cited

U.S. PATENT DOCUMENTS

| | | | | |
|---|---|---|---|---|
| 6,570,584 | B1 | 5/2003 | Cok et al. | |
| 2005/0280871 | A1* | 12/2005 | Gardella et al. | 358/3.13 |
| 2006/0244693 | A1* | 11/2006 | Yamaguchi et al. | 345/76 |
| 2008/0055266 | A1* | 3/2008 | Harada et al. | 345/173 |
| 2010/0283738 | A1* | 11/2010 | Kanki | 345/173 |

* cited by examiner

*Primary Examiner* — Alexander Eisen
*Assistant Examiner* — Robin Mishler
(74) *Attorney, Agent, or Firm* — Thomas, Kayden, Horstemeyer & Risley, LLP

(57) ABSTRACT

A field-sequential display apparatus and a display system which is capable of sensing pixel address are provided. The field-sequential display apparatus comprises a plurality of pixels, each of which is adapted to present a plurality of display states. The display states includes at least one colored light and an invisible light, wherein the at last one colored light and invisible light are alternately displayed, and the invisible light is adapted to transmit the address information of the pixel.

22 Claims, 2 Drawing Sheets

FIELD-SEQUENTIAL DISPLAY APPARATUS AND DISPLAY SYSTEM CAPABLE OF SENSING PIXEL ADDRESS

This application claims the benefits of priority based on Taiwan Patent Application No. 096136241 filed on Sep. 28, 2007; the disclosures of which are incorporated by the reference herein in their entirety

CROSS-REFERENCES TO RELATED APPLICATIONS

Not applicable.

BACKGROUND OF THE INVENTION

1. Field of the Invention

The present invention relates to a field-sequential display apparatus and a display system for sensing a pixel address. More particularly, the present invention relates to a field-sequential display apparatus and a display system for transmitting the pixel address information by means of an invisible light.

2. Descriptions of the Related Art

Input devices have found widespread applications in modern life. For example, to facilitate the operation, many apparatuses such as personal computers, mobile phones, automatic teller machines (ATMs), express transit ticket machines are all equipped with various input devices or interfaces for users to input the necessary information. Conventional input devices such as keyboards, mice, mechanical keys are all categorized as separately installed input interfaces or devices, which convert the information input by a user into a signal for display on a screen or for further processing.

Recently, the touch panel has emerged as a result of technological advancement. The touch panel has an input interface integrated with a display, so that the user may directly input instructions by touching the display screen with a finger or a pen. For example, if a mobile phone is provided with a touch panel, most of the conventional keys otherwise needed on the phone are not needed anymore so that a large size screen may be equipped within a restricted space. Moreover, the touch panel may bring a brand new operational interface to the mobile phone user. Conceivably, products equipped with a touch panel will be competitive on the market.

Typically, technologies adopted for common touch panels are generally classified into resistive touch panels, capacitive touch panels and optical touch panels. Among these touch panels, the resistive touch panel utilizes touch pressure when the upper electrode and lower electrode come into contact with each other, so that the controller can calculate the corresponding touch position by detecting the voltage variation of the panel. On the other hand, in the capacitive touch panel, when a user touches the panel, a capacitance variation will occur due to the interaction between the arranged transparent electrodes and the user so that the corresponding coordinate information may be obtained based on the induced current. However, to provide accurate and fine positional information, an algorithm has to be used to recognize the position of a touched pixel no matter what kind of technology is used. In other words, the technologies adopted in the conventional touch panels perform a trivial computation, which tends to consume more computational resources and increase the cost and implementation difficulty of the touch panel.

In summary, efforts still have to be made in the art to decrease the computational complexity of the positioning operation in a touch panel and to reduce the overall cost thereof.

SUMMARY OF THE INVENTION

One objective of the present invention is to provide a field-sequential display apparatus comprising a plurality of pixels. Each of the pixels is adapted to present a plurality of display states comprising at least one colored light and an invisible light. The colored light and the invisible light are alternately illuminated. The invisible light is adapted to transmit address information corresponding to the pixel.

Another objective of the present invention is to provide a display system for sensing a pixel address. The display system comprises a field-sequential display apparatus, a receiving unit, a transmission unit and a processing unit. The field-sequential display apparatus comprises a plurality of pixels, each of which is adapted to present a plurality of display states comprising at least one colored light and an invisible light. The colored light and the invisible light are alternately illuminated, and the invisible light is adapted to transmit an address information corresponding to the pixel. The receiving unit is configured to receive the invisible light to acquire the address information. The transmission unit is connected to the receiving unit to transmit the address information, while the processing unit is configured to receive and process the address information. In this way, the display system may determine the pixel corresponding to the receiving unit.

Yet a further objective of the present invention is to provide a field-sequential display apparatus comprising a plurality of pixels. Each of the pixels comprises a first sub-pixel and a second sub-pixel. The first sub-pixel is adapted to present at least one colored light, while the second sub-pixel is adapted to present an invisible light, in which the invisible light is adapted to transmit address information corresponding to the pixel.

Still a further objective of the present invention is to provide a display system for sensing a pixel address. The display system comprises a field-sequential display apparatus, a receiving unit, a transmission unit and a processing unit. The field-sequential display apparatus comprises a plurality of pixels, each of which comprises a first sub-pixel and a second sub-pixel. The first sub-pixel is adapted to present at least one colored light while the second sub-pixel is adapted to present an invisible light, in which the invisible light is adapted to transmit the address information corresponding to the pixel. The receiving unit is configured to receive the invisible light to acquire the address information. The transmission unit is connected to the receiving unit to transmit the address information. The processing unit is configured to receive and process the address information. In this way, the display system may determine the pixel corresponding to the receiving unit.

The field-sequential display apparatus of the present invention transmits the address information of a pixel thereof (which may be the coordinates of the pixel on the field-sequential display apparatus) by means of implicit information included in an invisible light. The address information is transmitted through a receiving apparatus or feeds it back to the field-sequential display apparatus. As a result, the display system can determine the pixel corresponding to the receiving unit, and control the display states of the pixel in response to the address information. Since the invisible light carrying the address information of the pixel does not affect the transmission of visible light, the field-sequential display apparatus can perform the subsequent process directly according to the address information. The present invention simplifies the algorithm complexity to decode the address information, thus resulting in reducing the computational complexity.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
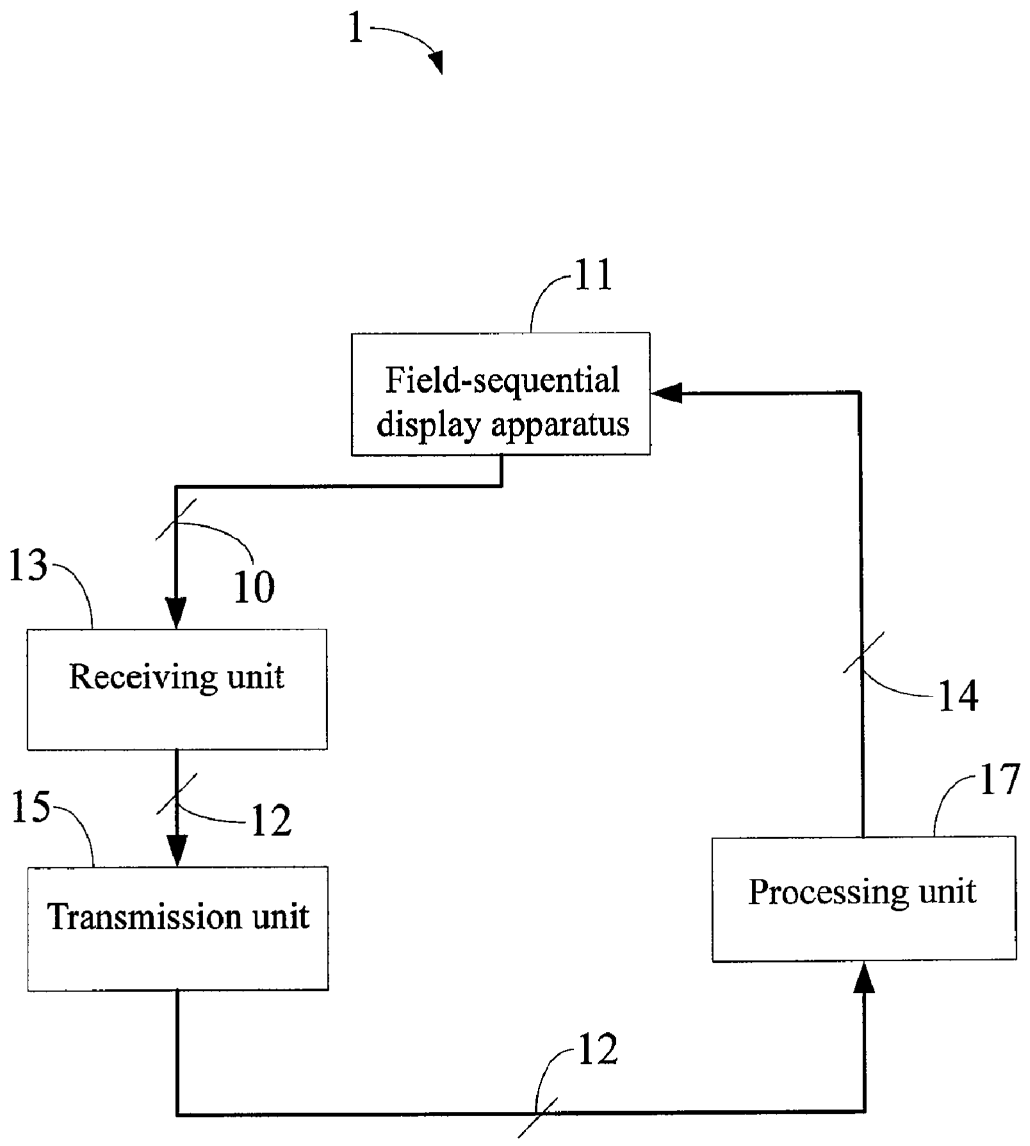
FIG. 1 is a schematic block diagram of the preferred embodiment of the present invention.

Description will now be made on the present invention with reference to the embodiments thereof. The present invention relates to a field-sequential display apparatus and a display system for sensing a pixel address. The field-sequential display apparatus of the present invention transmits the address information of a pixel thereof (e.g., coordinates of the pixel in the field-sequential display apparatus) by means of an invisible light, and subsequent processing is then made on the address information by a receiving apparatus (e.g., feeding it back to the field-sequential display apparatus). As a result, the display system can determine the pixel corresponding to the receiving unit and display the corresponding information. The computational complexity of positioning the pixel is thereby decreased. However, these embodiments are not intended to limit implementation of the present invention to any specific environment, applications, or particular manners described in these embodiments. Therefore, description of these embodiments is only illustrative of the present invention, rather than to limit the scope thereof. It should be noted that in the following embodiments and attached drawings, elements not associated directly with the present invention are omitted from the illustrations, and the dimension relationships among individual elements shown in the drawings are only for ease of understanding, rather than to limit the actual scale.

FIG. 1 illustrates the schematic block diagram of a display system 1 in accordance with the preferred embodiment of the present invention. The display system 1 comprises a field-sequential display apparatus 11, a receiving unit 13, a transmission unit 15 and a processing unit 17. The field-sequential display apparatus 11 comprises a plurality of pixels and a panel (not shown). Each of the pixels transmits an invisible light 10 that carries the address information 12 of the pixel, which will be described in detail hereinafter. The receiving unit 13 may substantially contact the panel of the field-sequential display apparatus 11, thereby to receive the invisible light 10 to obtain the information 12. It should be noted that since this embodiment works by transmitting an invisible light 10 that carries address information, it is not required for the receiving unit 13 to contact the panel of the field-sequential display apparatus 11. In application, the receiving unit 13 usually comes into contact with the panel.

The transmission unit 15 is electrically connected to the receiving unit 13 to transmit the information 12 to the processing unit 17. In this embodiment, the transmission unit 15 may transmit the information 12 either through a wired line or wirelessly. For example, if implemented as a wireless transmission apparatus, the transmission unit 15 transmits the information 12 wirelessly to the processing unit 17. Upon receiving the information 12, the processing unit 17 may perform the subsequent process, for example, to generate a first signal 14 recognizable to the field-sequential display apparatus 11 and then transmit the first signal 14 to the field-sequential display apparatus 11. Thus, the display system 1 can determine the pixel corresponding to the receiving unit 13. The field-sequential display apparatus 11 then adjusts the corresponding display state of the pixel in response to the first signal 14.

Figure 2:
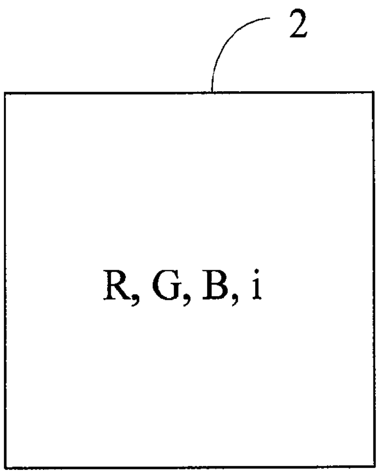
FIG. 2 is a schematic view illustrating the pixel of the preferred embodiment of the present invention corresponding to FIG. 1.

In more detail, as shown in FIG. 2, the field-sequential display apparatus 11 of this embodiment comprises a plurality of pixels, only one of which is illustrated in FIG. 2 for purpose of simplicity. Each of the pixels 2 is adapted to present a plurality of display states. These display states comprise at least one colored light and an invisible light which are displayed alternately. As described above, the invisible light in this embodiment is adapted to carry information related to the address of respective pixels. More specifically, the colored light described above comprises a red light R, a green light G and a blue light B (i.e., the three primary colors), which are displayed alternately and sequentially on the pixel 2 with the invisible light i.

For example, to adapt to the visual persistence, the field-sequential display apparatus 11 can transmit frames at a rate of about 60 frames per second. In this case, the user may perceive a smooth image as long as each of the sub-frames (i.e., the red light R, the green light G, the blue light B and the invisible light i) has a capability to display 240 frames within 1 second. As a result, with the red light R, the green light G, the blue light B and the invisible light i displayed alternately in sequence, the desired display effect can still be obtained. In other words, as long as each of the red light R, the green light G and the blue light B has a capability to transmit at least 240 frames within 1 second, the three visible light components can be mixed with each other to present various colors, and make the user to perceive a smooth frame. Meanwhile, the invisible light 10 is alternately displayed with the visible light component to transmit information related to the address of the pixel (the information may be considered as coordinates of the pixel in the field-sequential display apparatus 11 in this embodiment). It should be noted that this embodiment is only of an illustrative nature, and since the invisible light i is irrelevant to the visual persistence, the display frequency of the invisible light i is not required to be the same as the visible light as long as the pixel address signal can be transmitted.

Next, an approach for encoding the address information will be further described. In this embodiment, the address information may be a digital signal set, which conceivably comprises a start signal, an end signal and a coordinate signal (i.e., coordinates of a pixel). The start signal and the end signal are adapted to indicate the start and the end of the code, while the coordinate signal is transmitted between the start signal and the end signal. Preferably, the coordinate signal comprises at least two bits. For example, assuming that the panel of the field-sequential display apparatus 11 consists of 1024×768 pixels, since each of the digits ranges from 0 to 9, only 4 bits are needed to represent each of the digits. In other words, the digit 0 is represented as 0000, and the digit 9 is represented as 1001. Assuming that the start signal is 1111, the end signal is 1110, and the pixel coordinates to be transmitted are (326, 588), then the digital signal set will be 1111 0000 0011 0010 0110 0000 0101 1000 1000 1110. In this way, by representing 0 and 1 with the On and Off states of the invisible light respectively, and transmitting the invisible light alternately with the visible light, the address information can be transmitted to the receiving unit 13. Subsequently, the address information is converted by the transmission unit 15 and the processing unit 17 into the first signal 14 that is recognizable to the field-sequential display apparatus 11. In response to the first signal 14, the field-sequential display apparatus 11 adjusts the display states of the pixel and thus, is able to respond to the touch control function in the display system 1. It should be emphasized that the encoding approach described above is only of an illustrative nature, and not to limit the scope of the present invention. Other encoding approaches may also be used instead in other embodiments.

With the above configuration of the display system provided in this embodiment, the address information of the pixels of the field-sequential display apparatus can be transmitted by an invisible light, and then fed back to the field-sequential display apparatus via a receiving apparatus, so that the field-sequential display apparatus can adjust the display states of the pixel on the field-sequential display apparatus according to the address information directly.

Figure 3:
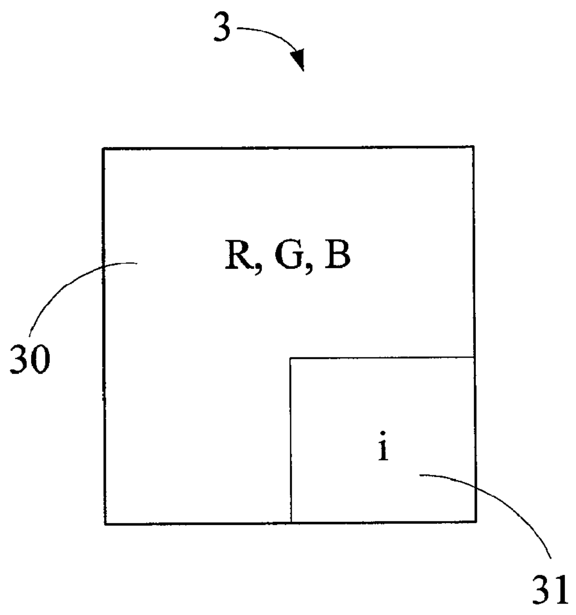
FIG. 3 is a schematic view illustrating the pixel of another preferred embodiment of the present invention.

Another preferred embodiment of the present invention is a display system, which is generally the same as the above embodiment. This embodiment differs from the above embodiment mainly in the configuration of the pixels, so only the differences therebetween will be described in detail hereinafter. As shown in FIG. 3, each of the pixels 3 in this embodiment comprises a first sub-pixel 30 and a second sub-pixel 31. The first sub-pixel 30 is adapted to present at least one colored light comprising a red light R, a green light G and a blue light B, while the second sub-pixel 31 is adapted to present an invisible light i for transmitting the address information related to of the pixel. In other words, the invisible light i of this embodiment is transmitted by the second sub-pixel 31 independently. Since the first sub-pixel 30 and the second sub-pixel 31 emit light independently from each other, the most prominent difference from the above embodiment is that the invisible light i is emitted simultaneously with the colored light. Optionally, this display system may further comprise a coating (not shown) formed on the first sub-pixel 30 to absorb the invisible light i emitted from the second sub-pixel 31 to avoid interference or impact of the invisible light i and the colored light with each other.

In summary, according to the present invention, the address information of a pixel is transmitted by an invisible light, and is further processed by a receiving apparatus, for example, sending the light back to the field-sequential display apparatus. As a result, the field-sequential display system can determine the pixel corresponding to the receiving unit, and control the display states of the pixel in response to the address information. Since the invisible light carries the address information of the pixel, the field-sequential display apparatus can adjust the display states of the pixel directly according to the address information without using a complex algorithm. As a result, the present invention can decrease the computational complexity for positioning a pixel, thus effectively overcoming the shortcomings of the apparatus in the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A field-sequential display apparatus, comprising a plurality of pixels, each of the pixels being adapted to present a plurality of display states, the display states comprising:

at least one colored light; and an invisible light;

wherein the at least one colored light and the invisible light are alternately illuminated, and the invisible light is adapted to transmit an address information corresponding to the pixel.

2. The field-sequential display apparatus as claimed in claim 1, wherein the at least one colored light comprising a red light, a green light and a blue light is alternately illuminated with the invisible light, sequentially.

3. The field-sequential display apparatus as claimed in claim 1, wherein the address information is a digital signal set comprising a start signal, an end signal and a coordinate signal, which is transmitted between the start signal and the end signal.

4. The field-sequential display apparatus as claimed in claim 3, wherein the coordinate signal consists of at least two bits.

5. A display system for sensing pixel address, comprising:

a field-sequential display apparatus comprising a plurality of pixels, each of the pixels adapted to present a plurality of display states, the display states comprising at least one colored light and an invisible light, wherein the at least one colored light and the invisible light are alternately illuminated, and the invisible light is adapted to transmit an address information corresponding to the pixel;

a receiving unit, being configured to receive the invisible light to acquire the address information;

a transmission unit, being connected to the receiving unit to transmit the address information; and a processing unit, being configured to receive and process the address information;

whereby the display system determines the pixel corresponding to the receiving unit.

6. The display system as claimed in claim 5, wherein the at least one colored light comprising a red light, a green light and a blue light is alternately illuminated with the invisible light, sequentially.

7. The display system as claimed in claim 5, wherein the address information is a digital signal set comprising a start signal, an end signal and a coordinate signal, which is transmitted between the start signal and the end signal.

8. The display system as claimed in claim 7, wherein the coordinate signal consists of at least two bits.

9. The display system as claimed in claim 5, wherein the processing unit transmits a first signal to the field-sequential display apparatus in response to the address information, and the field-sequential display apparatus adjusts the display states of the pixels in response to the first signal.

10. The display system as claimed in claim 5, wherein the transmission unit is a wireless transmission apparatus.

11. The display system as claimed in claim 5, wherein the field-sequential display apparatus further comprises a panel, and the receiving unit substantially contacts with the panel to receive the invisible light.

12. A field-sequential display apparatus comprising a plurality of pixels and a coating, each of the pixels comprising a first sub-pixel and a second sub-pixel, wherein the first sub-pixel is adapted to present at least one colored light the second sub-pixel is adapted to present an invisible light, wherein the at least one colored light and the invisible light are alternately illuminated, and the invisible light is adapted to transmit an address information corresponding to the pixel and the coating is correspondingly formed on the first sub-pixel to absorb the invisible light emitted from the second sub-pixel.

13. The field-sequential display apparatus as claimed in claim 12, wherein the at least one colored light comprises a red light, a green light and a blue light.

14. The field-sequential display apparatus as claimed in claim 12, wherein the address information is a digital signal set comprising a start signal, an end signal and a coordinate signal, which is transmitted between the start signal and the end signal.

15. The field-sequential display apparatus as claimed in claim 14, wherein the coordinate signal consists of at least two bits.

16. A display system for sensing pixel address, comprising:

a field-sequential display apparatus comprising a plurality of pixels and a coating, each of the pixels comprising a first sub-pixel and a second sub-pixel, wherein the first sub-pixel is adapted to present at least one colored light, the second sub-pixel is adapted to present an invisible light, wherein the at least one colored light and the invisible light are alternately illuminated, and the invisible light is adapted to transmit an address information corresponding to the pixel and the coating is correspondingly formed on the first sub-pixel to absorb the invisible light emitted from the second sub-pixel;

a receiving unit, being configured to receive the invisible light to acquire the address information;

a transmission unit, being connected to the receiving unit to transmit the address information; and a processing unit, being configured to receive and process the address information;

whereby the display system determines the pixel corresponding to the receiving unit.

17. The display system as claimed in claim 16, wherein the at least one colored light, comprising a red light, a green light and a blue light.

18. The display system as claimed in claim 16, wherein the address information is a digital signal set comprising a start signal, an end signal and a coordinate signal, which is transmitted between the start signal and the end signal.

19. The display system as claimed in claim 18, wherein the coordinate signal consists of at least two bits.

20. The display system as claimed in claim 16, wherein the processing unit transmits a first signal to the field-sequential display apparatus in response to the address information, and the field-sequential display apparatus adjusts the display states of the pixels in response to the first signal.

21. The display system as claimed in claim 16, wherein the transmission unit is a wireless transmission apparatus.

22. The display system as claimed in claim 16, wherein the field-sequential display apparatus further comprises a panel, and the receiving unit substantially contacts with the panel to receive the invisible light.

* * * * *